(12) United States Patent
Delacou

(10) Patent No.: US 6,279,438 B1
(45) Date of Patent: Aug. 28, 2001

(54) METAL CUTTING MACHINING DEVICE, WITH MASSIVE BLOCK AND SLIDING COLUMN AND MACHINE INTEGRATING THIS DEVICE

(76) Inventor: Jean-Michel Delacou, 6 Grande Rue, 85130 Tiffauges (FR)

( * ) Notice: Subject to any disclaimer, the term of this patent is extended or adjusted under 35 U.S.C. 154(b) by 0 days.

(21) Appl. No.: 09/341,971

(22) PCT Filed: Jan. 8, 1998

(86) PCT No.: PCT/FR98/00023

§ 371 Date: Jul. 16, 1999

§ 102(e) Date: Jul. 16, 1999

(87) PCT Pub. No.: WO98/31502

PCT Pub. Date: Jul. 23, 1998

(30) Foreign Application Priority Data

Jan. 20, 1997 (FR) .................................................. 97 00708

(51) Int. Cl.[7] .................. B23B 9/00; B23B 19/02
(52) U.S. Cl. .................. 82/121; 82/129; 82/137; 82/142
(58) Field of Search ............................... 82/147, 146, 129, 82/120, 121, 142, 159, 137, 160, 168

(56) References Cited

U.S. PATENT DOCUMENTS

| | | |
|---|---|---|
| 3,263,530 | 8/1966 | Pleger et al. . |
| 3,630,534 * | 12/1971 | Better .................................. 409/232 |
| 4,604,008 | 8/1986 | Bone . |
| 5,062,330 * | 11/1991 | Trautmann et al. ................... 82/147 |
| 5,551,811 * | 9/1996 | Satran et al. ............................ 407/40 |
| 5,787,560 * | 8/1998 | Schalles .................................. 29/36 |
| 5,809,837 * | 9/1998 | Shaffer ................................ 74/424.8 |
| 5,904,082 * | 5/1999 | Link et al. ............................. 82/129 |

FOREIGN PATENT DOCUMENTS

| | | |
|---|---|---|
| 0 172 299 A1 | 2/1986 | (EP) . |
| 405154701 * | 6/1993 | (JP) ..................................... 82/129 |

* cited by examiner

*Primary Examiner*—Henry Tsai
(74) *Attorney, Agent, or Firm*—Hoffmann & Baron, LLP

(57) ABSTRACT

A device for machining a part by metal cutting comprising a massive block in a bore of which is located a sliding column guided in a front bearing and a rear bearing, at least the front bearing and the section of the column sliding therein being continuously convex in cross-section with three lobes distributed at 120° about a central axis. The front and rear bearings are hydrostatic journal bearings. The column supports a sliding block on which is mounted a slide in which is incorporated a turret head for dispensing cutting tools.

9 Claims, 8 Drawing Sheets

METAL CUTTING MACHINING DEVICE, WITH MASSIVE BLOCK AND SLIDING COLUMN AND MACHINE INTEGRATING THIS DEVICE

BACKGROUND OF THE INVENTION

1. Field of the Invention

The present invention relates to a device for machining a workpiece by removing chips, forming part of a machine tool and comprising a positioning and longitudinal-displacement means. This may involve machining a workpiece, for example made of metal, be it cylindrical (by turning, drilling, shaving, cylindrical grinding) or not (by milling, drilling, grinding) with a view to obtaining a workpiece of predetermined size and shape.

2. Description of the Prior Art

The machine tools or machines for machining known to date consist of a support base on the ground, supporting or incorporating a bed for supporting the guide elements. These guide elements are made in the form of slideways of parallelepipedal—generally rectangular—cross section, which are not very stiff and therefore have to be supported along their entire length by a bed which thus gives the machine its precision and rigidity. This bed thus generally covers the entire surface of the machine and constitutes an obstacle to the efficient removal of chips.

To overcome this drawback, certain turning machines have been designed with a bed which is inclined to the operator or which is vertical. In this configuration, the latter constitutes an impediment to loading or unloading the machine. In particular, when installing automated production lines:

it makes it impossible to obtain a natural flow of workpieces when the exit point differs from the entry point, which means that factory layouts are not as optimized as they might be;

it means that the feed robot has to be installed on the same side of the machine as the operator, which results in difficulties with access for settings or maintenance.

As they lie in the flow of chips and cutting fluids, these beds and their guide systems require protection. This protection, which has to be telescopic to allow for the movements of the machine, and therefore very expensive, is not readily compatible with high speeds and accelerations. Used in a mass-production environment, for example for machining parts for the automotive industry, these protection elements quickly deform and thus offer passages through which the chips can pass, which has an adverse effect on the reliability and life of the machine. Once they have been in use for a certain amount of time, they act more as an obstacle to removing and cleaning away the chips than as a true barrier against the mechanical aggression of these chips.

Certain turning machines have been designed with a bed facing back towards the rear of the headstock, while at the same time maintaining guidance on slideways. Protection demarcating the chip zone from the mechanical-precision zone is still, however, very tricky to achieve and cleaning out chips which have managed to get in is almost impossible.

Furthermore, because of their presence, these beds fix the configuration of the axes, of the spindles and of the movements of the tools or workpieces with respect to the floor, and their relative positions.

In multi-spindle milling or punching-drilling machines, it is very important, for maintaining precision under the force exerted during cutting, that the resultant of the forces exerted on the guides by the cutting force be centred with respect to the guides so that they do not cause any deflection of the position of the axis of the spindle. This is very tricky to achieve with straightedge guides, or leads to U-shaped straightedge support structures which are therefore open and not very rigid.

A guide profile must have mechanical properties that are adequate for obtaining correct operation and good precision of the machines, namely:

1—It must have maximum bending stiffness to withstand the cutting forces and form, with the mass of the turret system for changing tools and controlling additional axes (for example the X, Y, Z axes) with the tool fixed at the end of the spindle and the spindle of a machining centre or with the mass of any other machining or workpiece holder system fixed at its end, an assembly whose natural frequency of vibration is high enough that it does not disrupt the cutting process.

2—Its torsional stiffness must be high enough that, while withstanding the overturning moment that is due to the cutting force, does not affect the precision of the machine.

3—Its mass must be low so that speeds and accelerations compatible with the current design of so-called "agile" machines, namely a speed of 1 m/s and an acceleration of 10 $m.s^{-2}$ can be obtained economically.

4—Its shape must be simple, cylindrical, and its profile must be as constant as possible so that it can be machined by surface grinding and so that hydrostatic guide bearings can be developed (eliminating wear), and so that effective protection against the ingress of chips into the bearings can be achieved simply by scraping over a continuous profile.

5—Its shape must be able, without the addition of an additional guidance system, to angularly position the system fixed to the end of this column.

Points 1, 2, 3 and 4 are advantageously optimized by the use of a cylindrical column of circular profile, this having maximum moment of inertia for minimum mass. This solution has already been used to produce guides fixed to a bed. By contrast, as it requires an additional angular-positioning system, it does not satisfy point 5, a condition which is essential for simplifying chip protection.

Specifically, additional prismatic guidance amounts to:

either designing a bed which has chip retainers and requires the use of telescopic protectors which are incompatible with good operational reliability in a mass-production environment;

or to using a key system, or any other currently known system for preventing rotation which, depending on its position:

at the front: constitutes a difficulty with scraping and sealing which is not compliant with point 4, at the rear: constitutes an asymmetry in the way that torque is taken up, thus creating eccentricity and bending in the column, which is detrimental to the high precision desired.

Document U.S. Pat. No. 4,604,008 A discloses a machining device comprising, in a conventional chassis, a longitudinal-displacement means with rotation being prevented, using a four-lobed cross section, the assembly itself being capable of being rotated. Document U.S. Pat. No. 3,263,530 A discloses a head of a precision boring device of four-lobed cross section. Document EP 0 172 299 A discloses a compact machine tool. None of these is able to dispense with a bed.

OBJECTS AND SUMMARY OF THE INVENTION

The object of the present invention is to provide a machining device that overcomes the drawbacks that result from the use of a bed supporting straight edges for guiding moving parts, and which overcomes the shortcomings of the guide profiles hitherto used.

The device in accordance with the invention comprises a massive block in a first bore of which there is housed a sliding column guided in a front bearing and a rear bearing, at least the front bearing and that section of the column that slides therein being of continuously convex cross section with three lobes 120° apart about a central axis, a spindle, preferably with an incorporated motor, being positioned in a second bore in the said massive block.

Thus, according to the invention, the bed is dispensed with and replaced by a massive block of dense and inexpensive material, for example a block of natural or reconstituted granite (a composite material made of granite chips held together by a binder of the chemical resin type), the block supporting the special guide of the invention allowing work at an unsupported overhang.

Advantageously, for reasons concerned with the simplicity of achieving the precision of the machined workpieces without resorting to sophisticated expansion-compensation software, the coefficient of expansion of the block is similar to that of steel, namely of the order of $10 \times 10^{-6}$ meters per meter per degree Celsius.

Advantageously, the block has two perfectly planar and parallel opposite faces, for the attachment and relative-position adjustment of the bearings that guide the mobile column or columns.

The block may have other bores, which may house various sliding columns of the same type as the main column or of a different type, or alternatively a spindle or any other device.

The bores, with no dimensional accuracy, allow the guide columns to pass through from one bearing to the other.

The block may be positioned either horizontally (with the axes of the bores horizontal, and the flat faces vertical), which makes it possible to assemble a frontal machine, or a turning machine with a tailstock for a lathe, or a horizontal-spindle milling unit for a machining centre; or vertically with a view to machining workpieces whose natural axis of transportation and handling is vertical (flat workpieces).

According to the invention, the same block may support, in particular:

either a guide column alone, supporting a spindle with built-in motor, for example for turning, milling, grinding, which spindle may have a number of degrees of freedom with respect to the movement of the column;

or a guide column alone supporting a tool-holder turret which may have a number of degrees of freedom with respect to the movement of the column;

or a built-in fixed spindle or a guide column supporting a spindle with a built-in motor, together with one or more guide columns supporting a tool-holder turret which may have a number of degrees of freedom.

Joining two or more blocks together using rigid and adequately sized spacer pieces makes it possible to obtain multi-spindle machines in which the relative position of the spindles is due merely to the shape and size of inexpensive static parts.

It will be understood that a block in accordance with the invention constitutes a standardized element, acting as a central unit. A number of central units make it possible to construct assemblies having from 1 to 4 simultaneous cutting units, the assemblies being incorporated into a single-spindle machine, the axis of which can be positioned either horizontally or vertically, or into a machine with two horizontal spindles face to face or parallel, which may be synchronized or independent. This concept may, by the juxtaposition of modules, be extended to an entire machining line. It means that the central unit alone can be marketed, it being possible for the complete machine to be designed and assembled around this central unit by an industrial partner, while at the same time being able to guarantee the level of precision and of performance.

The particular guide profile used according to the invention is a cylinder with a profile that is optimized between a triangular cross section which is well able to transmit overturning moments and gives good angular positioning, and a circular cross section which has the best rigidity and best machinability. In a different context, such a shape (sometimes known as a "polygon" or "epitrochoid") has been used to guide boring heads, according to document WO-A-93/15299. The use of a continuously non-concave multi-lobe cross section for precisionless mechanical guidance with the transmission of significant torque can be extended by the present invention to hydrostatic guidance giving precision compatible with the standards of exceptional precision that relate to guide structures for machine tools.

According to the invention, the use of a cylinder of continuously convex three-lobed shape gives a distribution of guide pressures the result of which is perfectly centred.

Furthermore, the localization of the pressure zones around the three lobes makes it possible to optimize the position of the points at which fluid is injected into the hydrostatic bearings and thus makes it possible to limit the cost of the pressure unit.

Such a profile can therefore guide the main movement of an independent cutting unit ready to be incorporated into any equipment asset dedicated to machining or, by incorporating a spindle into the basic block, may constitute the guidance for the Z movement (parallel to the axis of the spindle) of the spindle (machine with moving spindles or tailstocks) or of the tool holder (machine with headstocks), but also advantageously support the tailstock of a turning machine for machining long workpieces that need support at the opposite end to the end where the workpiece is held or any other system for holding or handling workpieces. Such a configuration leaves the installer of a machining line numerous possibilities for laying out a robot-controlled automatic loading system, given the fact that the spindle is directly accessible from 4 sides.

Other specific features and advantages of the invention will emerge from the description which follows, given by way of indication and with no implied limitation, relating to the appended drawings.

DETAILED DESCRIPTION OF THE INVENTION

Figure 1:
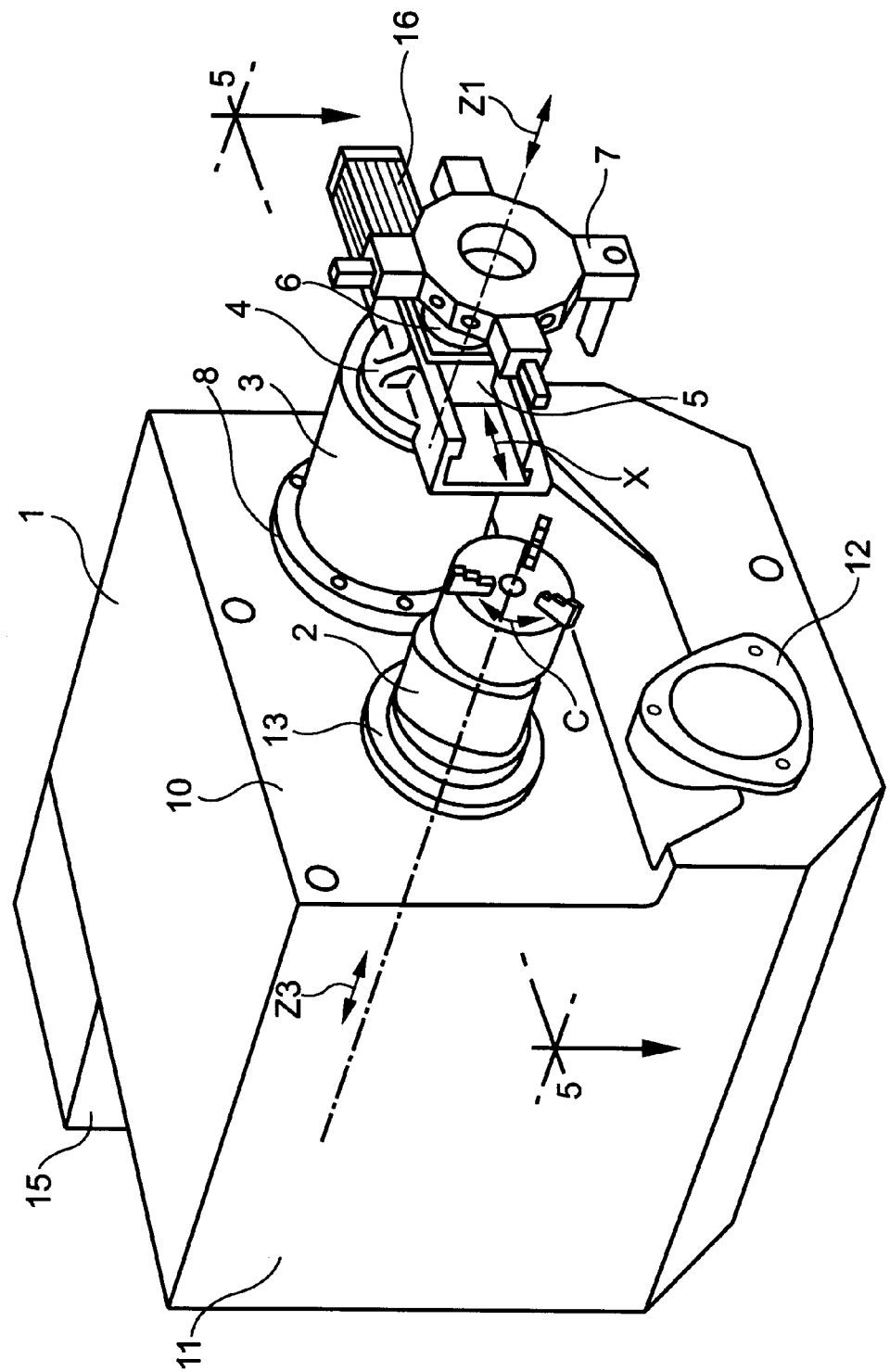
FIG. 1 shows, in perspective, a central unit comprising a fixed spindle and a tool-holder column according to the invention.

FIG. 1 depicts one possible design of a central machining unit to which the invention applies.

The block 1, made of natural granite or of granite and polymer resin composite, supports a spindle 2 with integrated motor 2 and a slide/saddle assembly consisting of a column 3 equipped at its end with a slide block 4 on which there moves along a transverse axis X a slide 5 in which is incorporated the turret 6 distributing cutting tools 7. The column 3 is guided longitudinally along the longitudinal axis Z1 by two bearings 8 and 9 (cf. also FIGS. 3 to 5). These two bearings are fixed to two perfectly planar and parallel surfaces 10 and 11 of the block 1. The precision of the parallelism of these two faces is the only precision element of this basic block.

A third support face 12 allows the tailstock or loading system options to be attached.

The polygonal external profile of the body of the spindle 2 according to the invention makes it possible, in certain configurations of the machines, either for automatically feeding the lathe with raw material in the form of bar stock or, for allowing two-spindle lathes to be loaded or alternatively for replacing the axis Z1, to make the spindle 2 able to move along an axis Z2. The body of the spindle 2 is then guided by a set of two hydrostatic bearings, a front one 13 and a rear one, respectively (the rear one bearing against the face 11 and not being depicted), in exactly the same way as the column 3 is guided.

Figure 2:
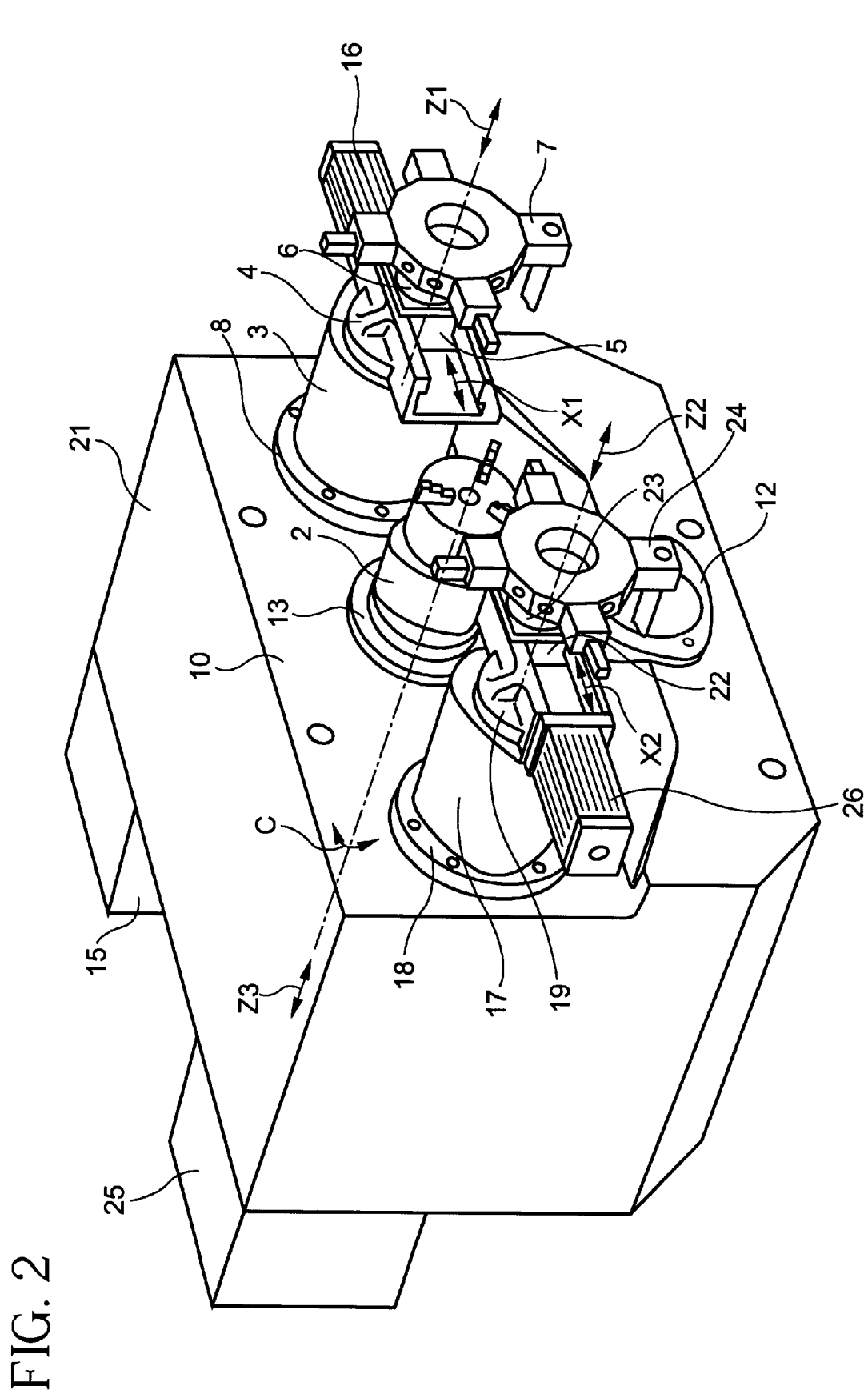
FIG. 2 shows, in perspective, the design of a central unit comprising a fixed spindle and two tool-holder columns according to the invention.

According to the embodiment depicted, in order to obtain an autonomous assembly, the motors have been incorporated into the mechanics and their variable-speed drives have been inserted in a chest 15 fixed directly onto the back of the block 1. Adjustments in the motor speed control loops on which the precision and performance in terms of speed and acceleration of the machine depend, are therefore completely incorporated into the central unit, which makes it possible to envisage the sale of this unit to partners who are manufacturers of equipment assets so that it can be adapted, by integration into a machine of its design, to the specific needs of its local market, particularly as far as safety standards, man-machine interface, and type of numerical control are concerned. FIG. 2 shows, in perspective, a central unit comprising a fixed spindle 2 and two tool-holder columns according to the invention. Positioned on a massive block 21 which is deeper than the block 1 but which can also come from a common mould partitioned for casting the block 1, is a second column 17 which is perfectly identical to the column 3. It too is guided in two hydrostatic bearings, a front bearing 18 and a rear bearing (not depicted) which are respectively identical to the bearings 8 and 9. It is fitted at its end with a slide block 19 (identical to 4) on which there moves, along a transverse axis X2, a slide 22 (identical to 5) into which is incorporated the turret 23 (identical to 6) for distributing cutting tools 24. Likewise, the motors are incorporated into the mechanics and their variable-speed drives inserted in a chest 25 fixed directly to the back of the block 21. It is therefore possible to use perfectly identical elements in the two sets of tools, hence achieving an appreciable reduction in production costs and stocks.

Figure 3:
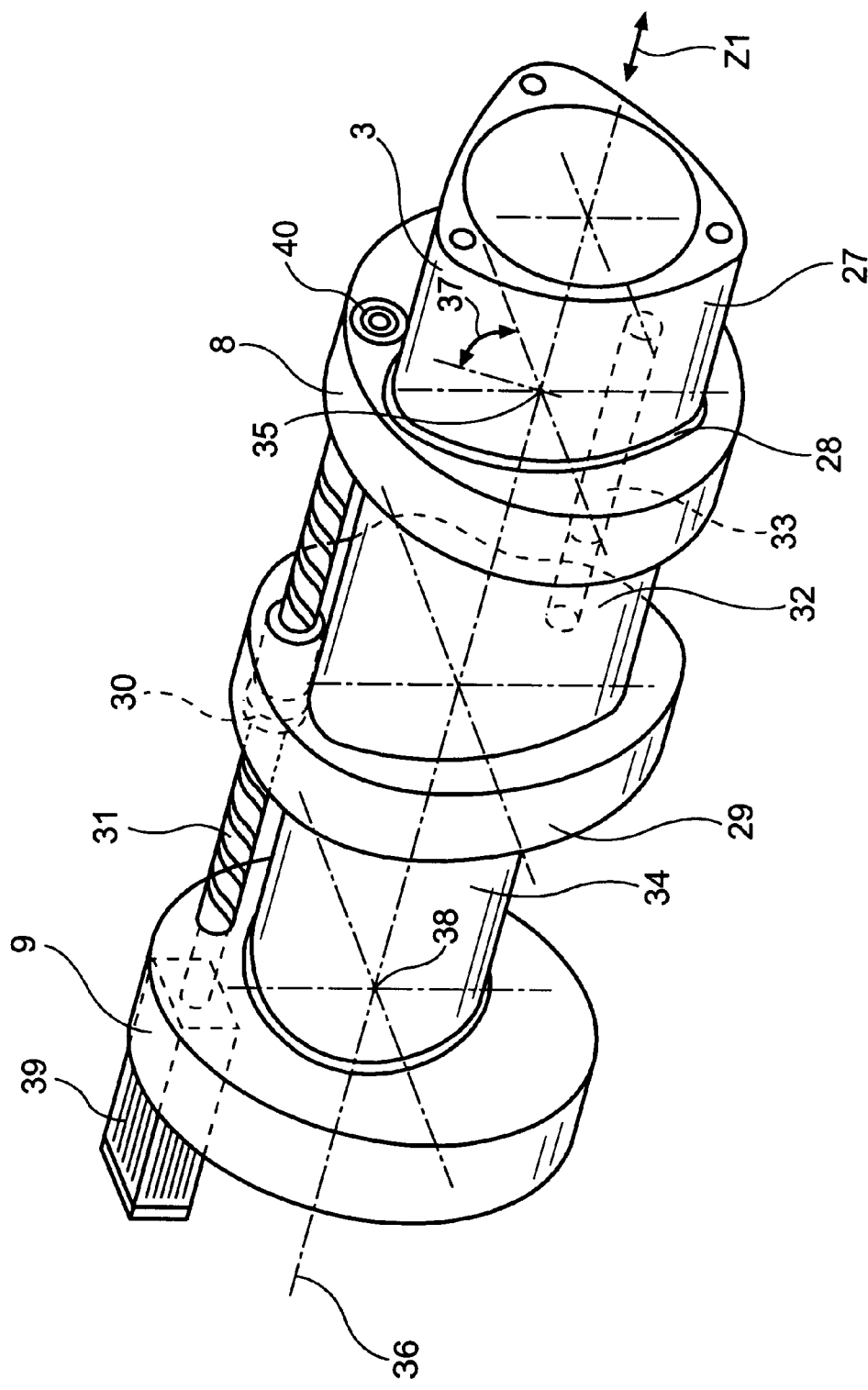
FIG. 3 illustrates the hydrostatic linear guidance according to the invention.

FIG. 3 is a detailed perspective view of one embodiment of a longitudinal axis produced according to the invention. The guide column 3 is a cylinder which is made up of three different coaxial sections:

The first section 27, at the front, is of continuously convex shape with three lobes, according to the invention; it allows the torque to be taken up as close as possible to the cutting force and is guided by a front hydrostatic bearing 8 determining a first point 35 on the axis 36 of the column and its orientation 37. Ingress of chips into the bearing is halted by a scraping seal with continuous profile 28. The uniformity of the exterior shape of the surface of the column 3 gives its precision and makes sure that the scraper 28 is effective. The second section 29, which is the intermediate section, is radially widened to form two ears. The first is for securing a nut 30 which collaborates with a ball screw 31. The second ear is for securing a mobile point 32 of a system 33 for measuring the position of the axis.

The third section 34, at the rear, is circular; it has only to locate a second point 38 of reference on the axis 36 of the column. It is guided hydrostatically by the bearing 9. In this example, the motor 39 for the numerical control of the axis is incorporated into the bearing 9, its rotor being shrink-fitted directly onto the ball screw 31 to avoid any additional coupling system, this making it possible to control the inertia of the axis and reduce the number of parts involved in the bill of materials for the machine. It is advantageous to produce the bearing 40, the axial reference bearing for the axis, in the front bearing 8, so that heating of the ball screw by the motor does not affect the precision of the axis.

Figure 4:
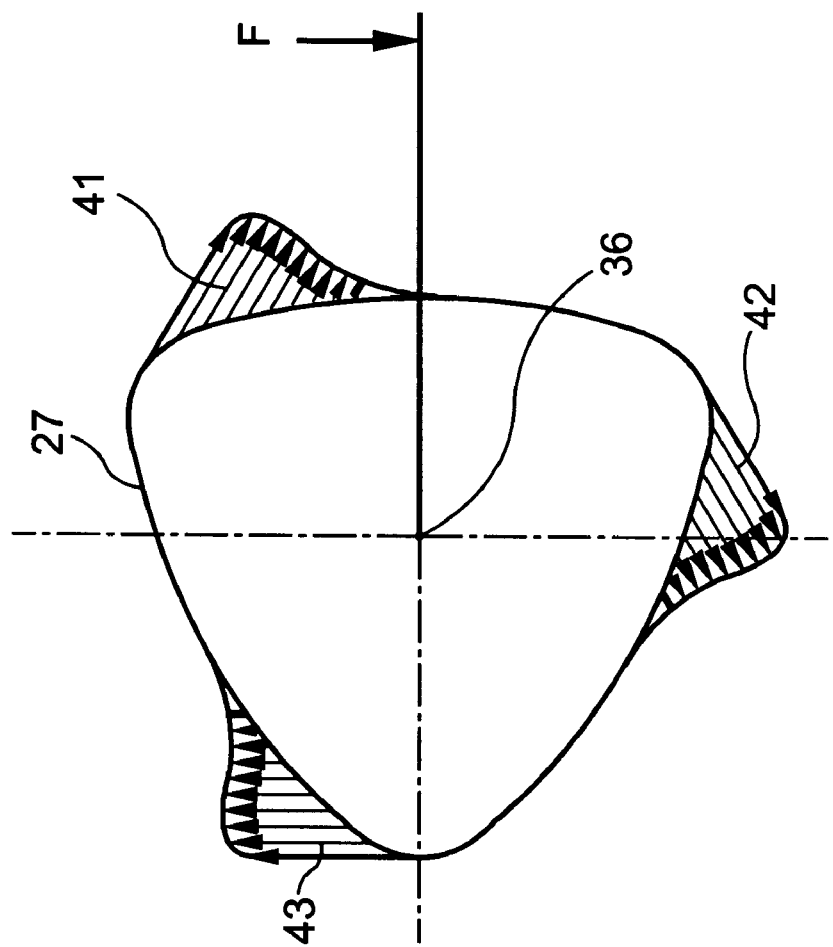
FIG. 4 shows the distribution of pressure over the lobes of the hydrostatic linear guidance according to the invention.

FIG. 4 shows the distribution of pressure on the lobes of the hydrostatic linear guide according to the invention. As the pressure zones 41, 42 and 43 are axisymmetric irrespective of the position of the force F that is to be withstood, there is no shifting of the axis 36 under the cutting force.

Figure 5:
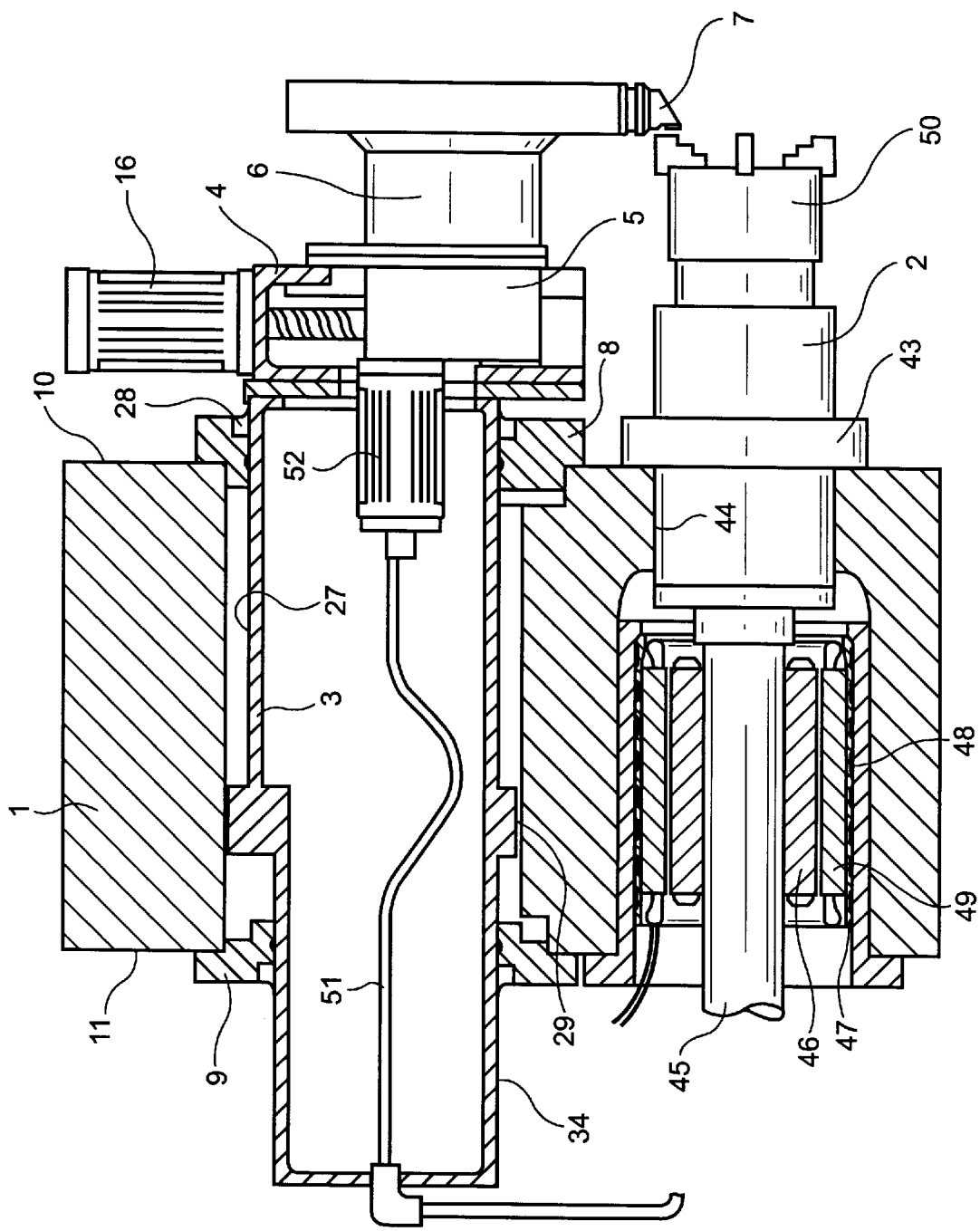
FIG. 5 shows a section along the line 5-5 of the central unit of FIG. 1, with an alternative form of spindle.

FIG. 5 shows a section along the line 5-5 of FIG. 1 of a central unit in an alternative two-axis form designed according to the invention. This central unit is formed of a spindle 2, fixed longitudinally in this alternative form, the spindle being fixed to the massive block 1 by means of a flange 43 and centered by the cylinder 44. The rotor 46 of the drive motor is shrink-fitted into the rear of the spindle, on its shaft 45. The stator 49 of the motor is shrink-fitted into a sleeve 47 which provides cooling through the circulation of water containing glycol through the spiral groove 48. At the front, a chuck 50 allows the workpiece to be held during the machining process.

The column 3 guided on the bearings 8 and 9 forms excellent protection for the passage and movement of the cables and pipes 51 and for the motor 52 of the turret 6.

Figure 6:
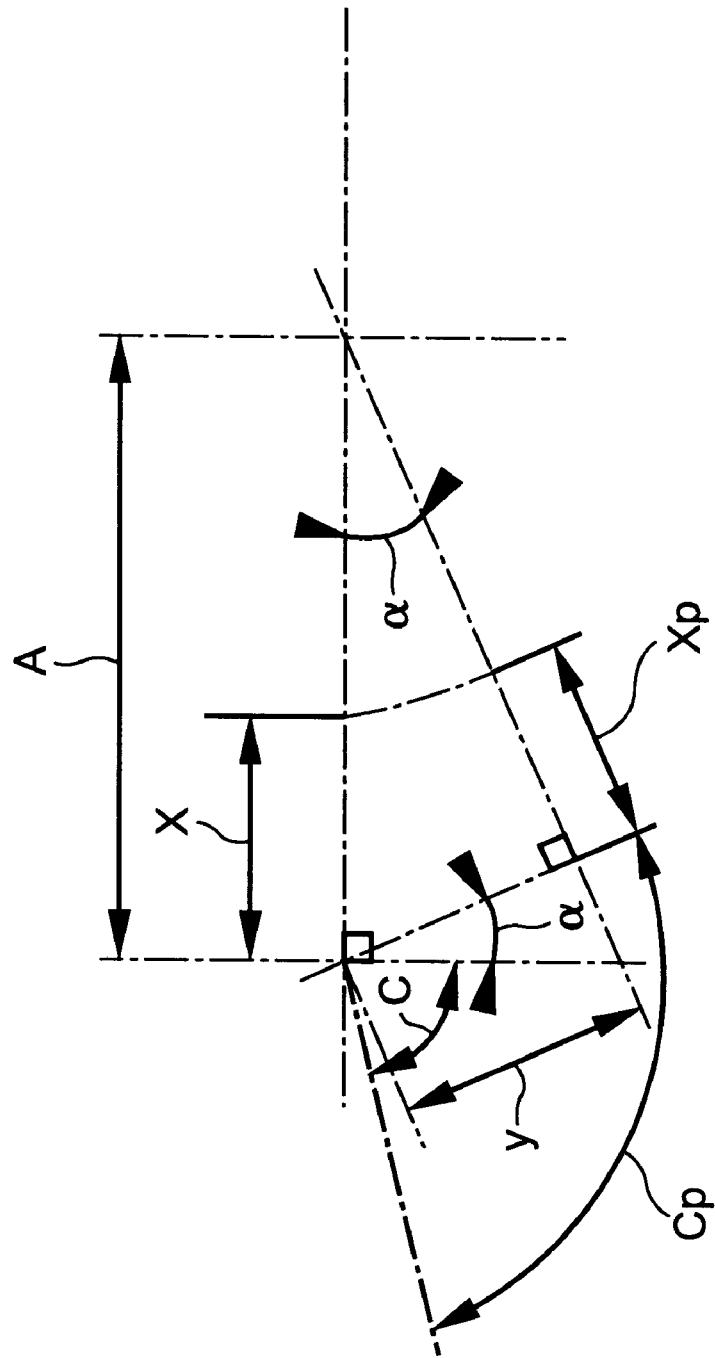
FIG. 6 shows the breakdown of the movements of the axes to obtain a Y movement according to the invention.

FIG. 6 shows the geometrical breakdown of the movements of the axes to obtain a Y movement according to the invention. The end of the column supporting the tool-holder turret may advantageously be fitted with a ring 53 for orientating the slide block, of the axis X, which, by numerical calculation, makes it possible to command an additional axis labelled Y perpendicular to the X-axis and to the Z-axis (cf. also FIG. 7). If A is the distance between the axis of rotation of the workpiece, which axis is determined by the axis of the spindle 2, and the axis of orientation of the ring, then:

$Y = A \sin \alpha$ $\alpha$ being the angle of inclination of the slide block 4.

A correction on the X-axis needs to be incorporated:

$$X = A \cos \alpha - (A - Xp) = Xp - A(1 - \cos \alpha)$$

Xp being the value read by the X-axis positioning system and Xp the actual value obtained on the workpiece [sic] and the value of the angular orientation of the workpiece needs to be compensated for:

$$C=Cp+\alpha=Cp+\arcsin(Y/A)$$

Cp being the value read by the system for orientating the workpiece (C-axis) and Cp the actual value obtained on the workpiece.

Figure 7:
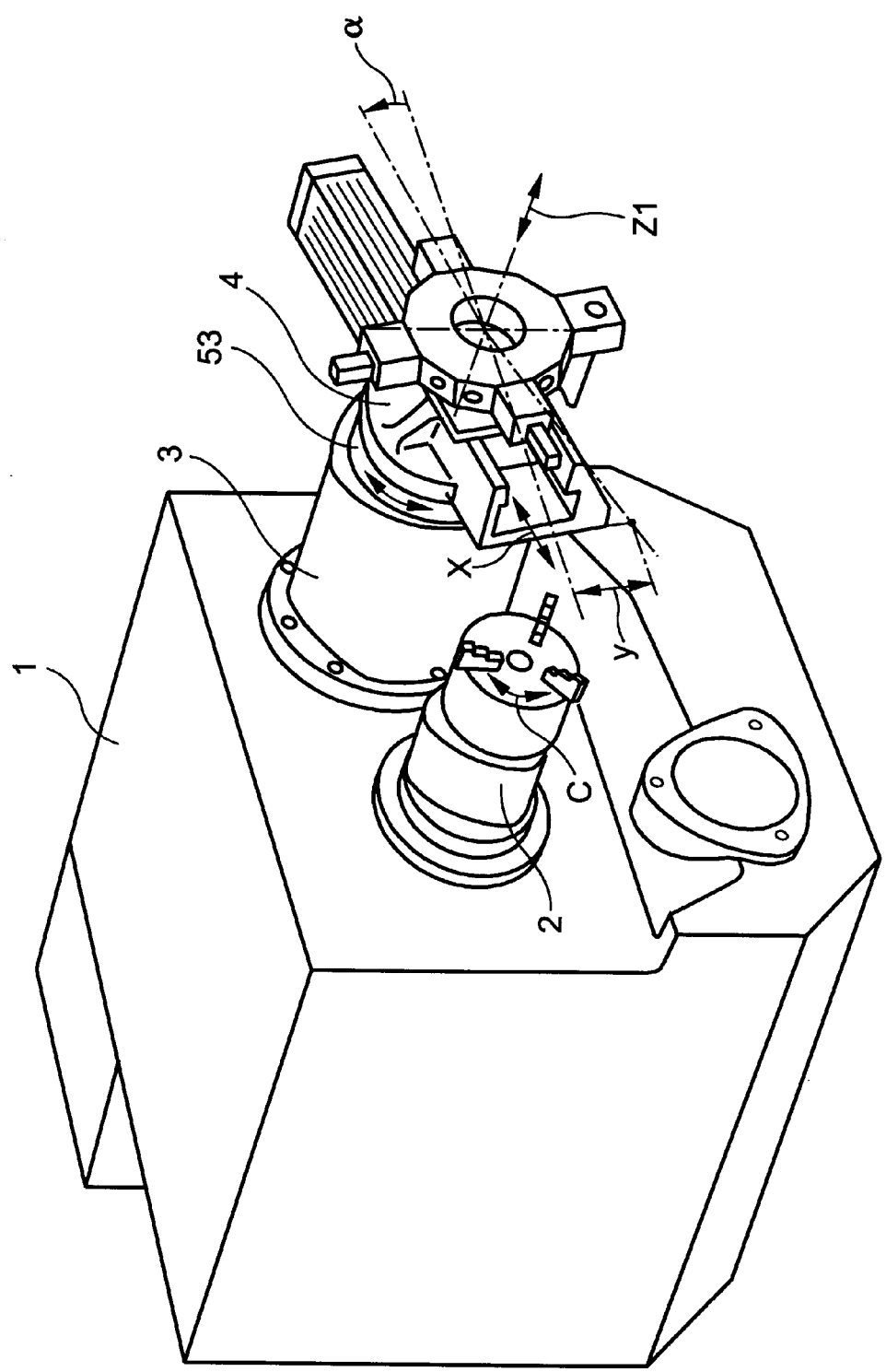
FIG. 7 shows, in perspective, a central unit comprising a fixed spindle and a tool-holder column according to the invention, the unit being equipped with a Y axis and a C axis.

FIG. 7 shows, in perspective, the design of a central unit comprising a fixed spindle and a tool-holder column according to the invention, the unit having a Y-axis and a C-axis. The spindle is angularly positioned by the built-in motor, the position being read by a sensor built into the motor using a principle that is known in the art. Inserted between the column 3 and the slide block 4 is an orientation ring 53 comprising a motor and an angular encoder which is accurate to $1/1000^{th}$ of a degree.

Figure 8:
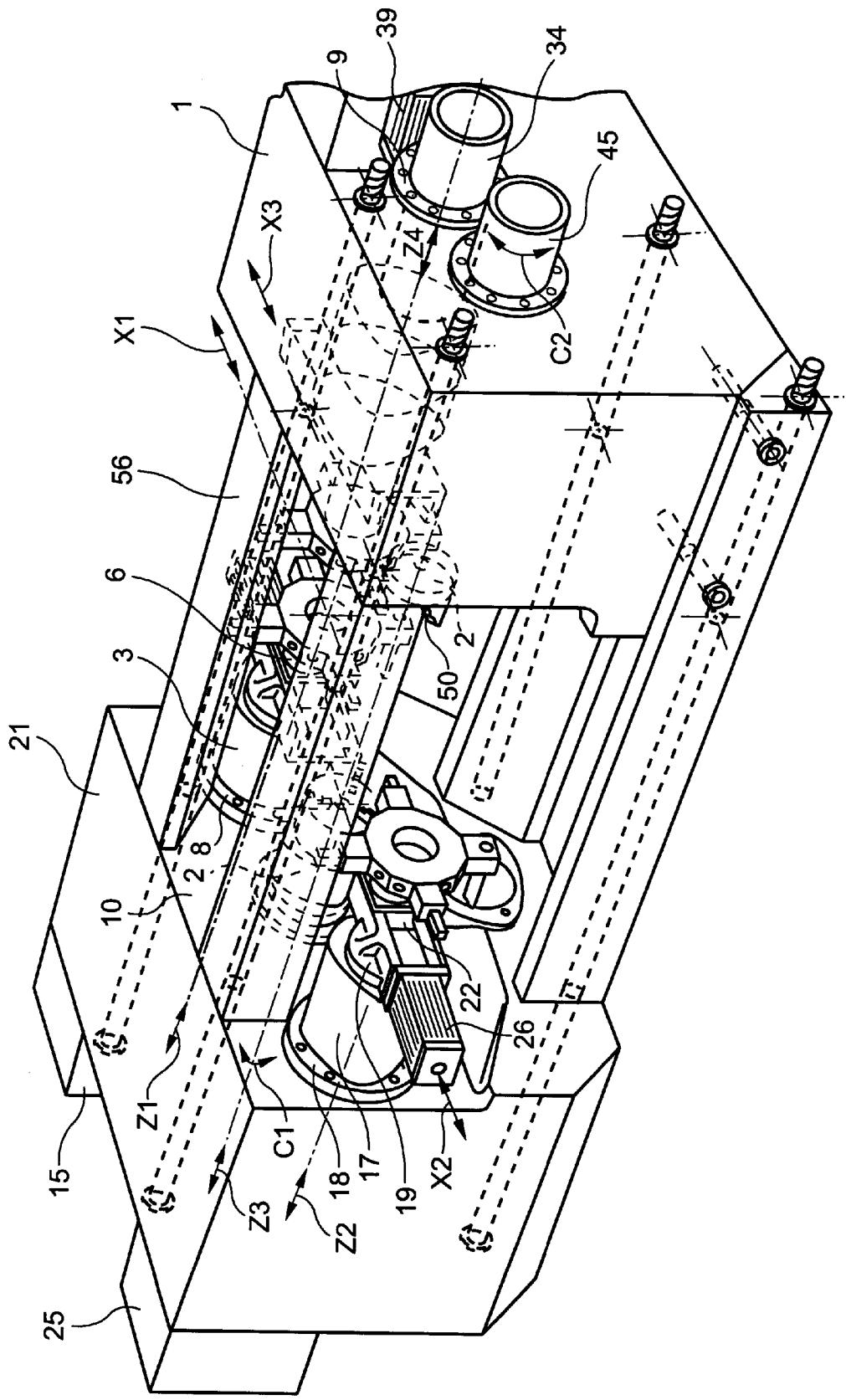

FIG. 8 shows, in perspective, a machine tool comprising two devices formed in accordance with the present invention with spindles facing each other, constituting a horizontal-axis two-spindle turning machine. The two blocks 1 and 21 are joined together using rigid and adequately sized spacer pieces 56.

What is claimed is:

1. Device for machining a workpiece by removing chips, comprising a chassis and a positional and longitudinal-displacement means, wherein the chassis is a massive block (1) comprising a first bore in which there is housed a sliding tool-holder column (3) guided in a front bearing (8) and a rear bearing (9), at least the front bearing (8) and that section (27) of the column (3) that slides therein being of continuously convex cross section with three lobes 120° apart about a central axis, and a second bore the axis of which is parallel to the axis of the first bore, in which there is positioned a slidable workpiece-holder spindle (2), having an incorporated motor, the column (3) being able to move relative to the spindle (2) and the workpiece being held by the spindle and being machined by a tool held by the column (3) during a machining operation to obtain an autonomous device.

2. Device according to claim 1, wherein the front (8) and rear (9) bearings are hydrostatic bearings.

3. Device according to claim 1, wherein the column (3) supports a slide block (4) on which there is mounted a slide (5) incorporated in which is a turret (6) for distributing cutting tools (7).

4. Device according to claim 3, further comprising an orientation ring (53) inserted between the column (3) and the slide block (4).

5. Device according to claim 1, wherein the spindle (2) is mounted in a sliding column of the same type as the column (3) in the first bore.

6. Device according to claim 3, wherein the block (1) comprises a third bore in which there is housed a second sliding tool-holder column (17) equipped with a slide block (19) and with a slide (22) bearing a turret (23) for distributing cutting tools (24).

7. Device according to claim 1, wherein the block (1) is made of granite.

8. Machine tool, comprising at least one device according to claim 1, arranged horizontally or vertically.

9. Machine tool according to claim 8, comprising two devices with spindles facing each other, constituting a horizontal-axis two-spindle turning machine.

* * * * *

UNITED STATES PATENT AND TRADEMARK OFFICE
CERTIFICATE OF CORRECTION

PATENT NO. : 6,279,438 B1  Page 1 of 1
DATED : August 28, 2001
INVENTOR(S) : Jean-Michel Delacou It is certified that error appears in the above-identified patent and that said Letters Patent is hereby corrected as shown below:

<u>Column 5,</u>
Following line 5, should read -- Figure 8 shows, in perspective, a machine tool comprising two devices formed in accordance with the present invention with spindles facing each other, constituting a horizontal axis two-spindle turning machine. --;
Line 14, now reads "motor 2 and a" should read -- motor and a --;

Signed and Sealed this

Seventeenth Day of September, 2002

*Attest:*

*Attesting Officer*

JAMES E. ROGAN
*Director of the United States Patent and Trademark Office*